United States Patent
Thomas et al.

(10) Patent No.: US 12,147,758 B1
(45) Date of Patent: Nov. 19, 2024

(54) LARGE LANGUAGE MODEL INTEGRATIONS FOR PIVOT TABLES IN SPREADSHEET ENVIRONMENTS

(71) Applicant: Microsoft Technology Licensing, LLC, Redmond, WA (US)

(72) Inventors: Olivia Jean Thomas, Boise, ID (US); Andrey A. Zaikin, Seattle, WA (US); Jake Elliot Armstrong, Kirkland, WA (US); Aftabalam Nooruddin Azmi, Woodinville, WA (US); Samrin Iqbal, Sugar Hill, GA (US); Sameer Surendra Jagdale, Vancouver (CA); Carlos Augusto Otero, Seattle, WA (US); Howard Su, Atlanta, GA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 18/336,138

(22) Filed: Jun. 16, 2023

(51) Int. Cl.
*G06F 40/18* (2020.01)
*G06F 40/20* (2020.01)

(52) U.S. Cl.
CPC .............. *G06F 40/18* (2020.01); *G06F 40/20* (2020.01)

(58) Field of Classification Search
CPC ................................... G06F 40/18; G06F 40/20
See application file for complete search history.

(56) References Cited

U.S. PATENT DOCUMENTS

| | | | |
|---|---|---|---|
| 2018/0203924 A1* | 7/2018 | Agrawal | G06F 40/18 |
| 2018/0239748 A1* | 8/2018 | Zhang | G06F 3/0482 |
| 2023/0185820 A1* | 6/2023 | Benoit | G06F 16/258 |
| | | | 707/756 |

OTHER PUBLICATIONS

Munisha Choudhary et al., A Web-Based Bilingual Natural Language Interface to Database, Dec. 1, 2015, Third International Conference on Image Information Processing, pp. 433-438 (Year: 2015).*

Prashant Gupta et al., IQS—Intelligent Querying System using Natural Language Processing, Apr. 1, 2017, International Conference on Electronics, Communication and Aerospace Technology, pp. 1-4 (Year: 2017).*

Coefficient: "Pivot Table Builder for Google Sheets: Use AI to Build Pivot Tables for You", Apr. 19, 2023, Retrieved from URL: https://www.youtube.com/watch?v=1NAzwgQHWFU, Retrieved on Aug. 14, 2024, pp. 1-2.

International Search Report and Written Opinion received for PCT Application No. PCT/US2024/031359, Sep. 16, 2024, 18 pages.

(Continued)

*Primary Examiner* — Tam T Tran

(57) ABSTRACT

Technology is disclosed herein for the integration of spreadsheet environments with LLM services. In an implementation, an application receives a natural language input from a user associated with a spreadsheet hosted by the application. The application generates a prompt that includes metadata about the spreadsheet and identifies a required format for descriptions of pivot tables. The application sends a prompt to a large language model (LLM) service to elicit a reply that includes a description of the pivot table having the required format. The application receives a reply to the prompt from the LLM service that includes the description of the pivot table in the required format. The application generates pivot table according to the reply from the LLM service.

20 Claims, 17 Drawing Sheets

(56) References Cited

OTHER PUBLICATIONS

Lee, Beri, "Pivot to the Cloud: Intelligent Features in Google Sheets Help Businesses Uncover Insights", Retrieved from URL: https://blog.google/products/g-suite/pivot-cloud-intelligent-featuresgoogle-sheets-help-businesses-uncover-insights/, Dec. 6, 2017, pp. 1-4.

Li, et al., "SheetCopilot: Bringing Software Productivity to the Next Level Through Large Language Models", arxiv.org, Cornell University Library, 201 Olin Library Cornell University Ithaca, NY, May 30, 2023, pp. 1-32.

* cited by examiner

| | C | D | E | F | G | H |
|---|---|---|---|---|---|---|
| 1 | Store | Product | Category | Sales | Growth | Rating |
| 2 | East | Apple | Fruit | $8 | 2% | 30% |
| 3 | East | Mango | Fruit | $6 | 6% | 30% |
| 4 | East | Spinach | Veg | $4 | 8% | 65% |
| 5 | East | Celery | Veg | $2 | 7% | 80% |
| 6 | East | Celery | Veg | $4 | 1% | 90% |
| 7 | North | Spinach | Veg | $2 | 8% | 70% |
| 8 | North | Celery | Veg | $2 | -2% | 82% |
| 9 | South | Mango | Fruit | $6 | 3% | 45% |
| 10 | South | Mango | Fruit | $6 | 9% | 50% |
| 11 | South | Spinach | Veg | $4 | 0% | 60% |
| 12 | West | Apple | Fruit | $8 | 8% | 20% |
| 13 | West | Apple | Fruit | $8 | -6% | 25% |

FIGURE 6A

| | A1 | | ∨ | fx | | | | | | | | |
|---|---|---|---|---|---|---|---|---|---|---|---|---|
| | | C | D | E | F | G | H | I | J | K | | |
| 1 | | | | | | | | | | | | |
| 2 | | Store | Category | Sum of Sales | | | | | | | | |
| 3 | | East | Fruit | 14 | | | | | | | | |
| 4 | | | Veg | 8 | | | | | | | | |
| 5 | | East Total | | 22 | | | | | | | | |
| 6 | | North | Veg | 6 | | | | | | | | |
| 7 | | North Total | | 6 | | | | | | | | |
| 8 | | South | Fruit | 12 | | | | | | | | |
| 9 | | | Veg | 4 | | | | | | | | |
| 10 | | South Total | | 16 | | | | | | | | |
| 11 | | West | Fruit | 16 | | | | | | | | |
| 12 | | West Total | | 16 | | | | | | | | |
| 13 | | Grand Total | | | | | | | | | | |

Spreadsheet interface (700) showing Excel with data table (702) containing columns: Year, Category, Product, Sales, Rating.

| Year | Category | Product | Sales | Rating |
|---|---|---|---|---|
| 2017 | Components | Chains | $ 20,000 | 75% |
| 2015 | Clothing | Socks | $ 3,700 | 22% |
| 2017 | Clothing | Bib-shorts | $ 4,000 | 22% |
| 2015 | Clothing | Shorts | $ 13,300 | 56% |
| 2017 | Clothing | Tights | $ 36,000 | 100% |
| 2015 | Components | Handlebars | $ 2,300 | 35% |
| 2016 | Clothing | Socks | $ 2,300 | 28% |
| 2016 | Components | Brakes | $ 3,400 | 36% |
| 2015 | Bikes | Mountain Bikes | $ 6,300 | 40% |
| 2017 | Components | Brakes | $ 5,400 | 38% |
| 2015 | Accessories | Helmets | $ 17,000 | 90% |
| 2016 | Accessories | Lights | $ 21,600 | 92% |
| 2016 | Accessories | Locks | $ 29,800 | 86% |
| 2016 | Components | Bottom Brackets | $ 1,000 | 23% |
| 2015 | Clothing | Jerseys | $ 6,700 | 5% |
| 2017 | Components | Bottom Brackets | $ 600 | 27% |
| 2015 | Bikes | Road Bikes | $ 3,500 | 50% |
| 2017 | Clothing | Jerseys | $ 7,500 | 40% |
| 2017 | Accessories | Tires and Tubes | $ 63,700 | 90% |
| 2017 | Bikes | Cargo Bikes | $ 9,300 | 60% |
| 2017 | Bikes | Mountain Bikes | $ 8,500 | 46% |
| 2017 | Accessories | Bike Racks | $ 33,700 | 92% |
| 2017 | Clothing | Caps | $ 600 | 15% |
| 2015 | Bikes | Mountain Bikes | $ 3,100 | 35% |
| 2017 | Accessories | Pumps | $ 30,700 | 95% |
| 2016 | Accessories | Pumps | $ 16,400 | 80% |
| 2016 | Accessories | Bike Racks | $ 22,100 | 90% |
| 2015 | Clothing | Caps | $ 500 | |
| 2016 | Clothing | Vests | $ 1,300 | |
| 2017 | Components | Handlebars | $ 5,000 | |
| 2016 | Bikes | Cargo Bikes | $ 6,700 | |
| 2015 | Clothing | Bib-shorts | $ 700 | |
| 2016 | Clothing | Bib-shorts | $ 2,900 | |
| 2015 | Accessories | Bike Racks | $ 300 | |

PivotGPT panel (701):

> Hello, I can help you summarize and aggregate your data with a PivotTable
>
> What do you want to know about your data?
>
> What are the sales for each product?

Prompt input box (703): "Enter your prompt here"

```
Based on this data:

<table metadata>

Respond using the following syntax, and nothing more, to describe an Excel
PivotTable that answers the following question:

#Examples

{"Row": [ "Product" ], "Column": [], "Value": [{"Field": "Sales", "Aggregation":
"Sum"}], "Filter": [{"Field": "Year", "Values": [ 2012, 2013 ]}]}

{"Row": [ "Category", "Product" ], "Column": [ "Year" ], "Value": [{ "Field":
"Rating", "Aggregation": "Average" }], "Sort": [{ "Field": "Rating", "Direction":
"Descending" }], "Filter": []}

AGGREGATION OPTIONS:

Sum, Count, Average, Max, Min, Product, Count Numbers, Standard Deviation,
Standard DeviationP, Variance, VarianceP

#Rules
1. The first row must include concise header names
2. The pivot table MUST be formatted as a JSON array
3. Generate at least 5 row and no more than 50 rows
4. Generate at least 2 columns and no more than 10 columns DESCRIPTION: <user input>
```

801

```
Here is an Excel PivotTable: <PivotTable JSON>
Adjust the PivotTable based on this prompt: <user input>
Use the same syntax as above and nothing else in your response.
```

LARGE LANGUAGE MODEL INTEGRATIONS FOR PIVOT TABLES IN SPREADSHEET ENVIRONMENTS

TECHNICAL FIELD

Aspects of the disclosure are related to the field of computer hardware and software solutions, and in particular to integrations between spreadsheet applications and large language models services.

BACKGROUND

Spreadsheet applications, such as Microsoft Excel®, are widely used for a variety of data management tasks relating to finance and accounting, data collection and analysis for scientific or technological research, project management, business-related activities such as inventory management, and so on. Spreadsheet capabilities include data analysis, computational operations, data organization and handling, macros and other types of automation for data handling, data presentation and visualization capabilities, such as charts and data tables.

Among the tools available for data analysis in spreadsheets are pivot tables. A pivot table is a table of values that reduces data in another, larger table in a spreadsheet, a database, or a business intelligence application. In an example reduction, a source table is populated with data arranged in columns and rows. Each row holds a single data record, while each column defines a specific field of the records. A pivot table created to summarize the data in the source table would consist of a smaller number of columns and rows that form cells populated with values produced by filtering and aggregating the source table.

Each cell in a pivot table holds the result of a unique query to the source table defined by the cell's position in the pivot table. That is, each cell in the pivot table resides at the intersection of a specific column and row of the pivot table. Each query therefore arises from the intersection of a specific column-row pair in the pivot table and serves to filter the source table based on the label(s) assigned to its column-row pair. A single pivot table cell can include information which is aggregated from one or more rows or columns of the source table.

A pivot table's configuration is governed by user input supplied via a configuration menu. The configuration menu may include, for example, a listing of the fields from the source data table. In configuring a pivot table, a user can assign, in the configuration menu, fields for the rows and columns of the pivot table as well as selecting a type of data aggregation or filtering. In addition, in assigning fields to the rows and columns of the pivot table, the user is afforded flexibility in the scope or granularity how the data is displayed. However, given this broad flexibility in configuring pivot tables, it can be challenging for users, particularly novice users, to configure a pivot table for a particular purpose or to reveal the analysis that the user seeks to reveal, particularly if the user is not entirely certain about what the user wants or needs to see. Indeed, for many users, finding the optimal pivot table configuration is often the result of trial and error. Other users simply give up in frustration, resulting in under-utilization of the capability.

Overview

Technology is disclosed herein for the integration of spreadsheet environments with large language model (LLM) services. In an implementation, an application receives a natural language input from a user associated with a spreadsheet hosted by the application. The application generates a prompt that includes metadata about the spreadsheet and identifies a required format for descriptions of pivot tables. The application sends a prompt to a LLM service to elicit a reply that includes a description of the pivot table having the required format. The application receives a reply to the prompt from the LLM service that includes the description of the pivot table in the required format. The application generates pivot table according to the reply from the LLM service.

In an implementation, the application generates a subsequent prompt to modify the pivot table based on a subsequent natural language input from the user. The subsequent prompt may include the description of the pivot table in the required format. In some implementations, the application parses the description of the pivot table to identify characteristics of the pivot table.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIGS. 6A-6E illustrate an exemplary operational scenario for an LLM integration for pivot tables in a spreadsheet environment in an implementation.

FIGS. 7A-7D illustrate an exemplary operational scenario for an LLM integration for pivot tables in a spreadsheet environment in an implementation.

FIG. 8 illustrates prompt templates for an LLM integration for pivot tables in an implementation.

DETAILED DESCRIPTION

Figure 1:
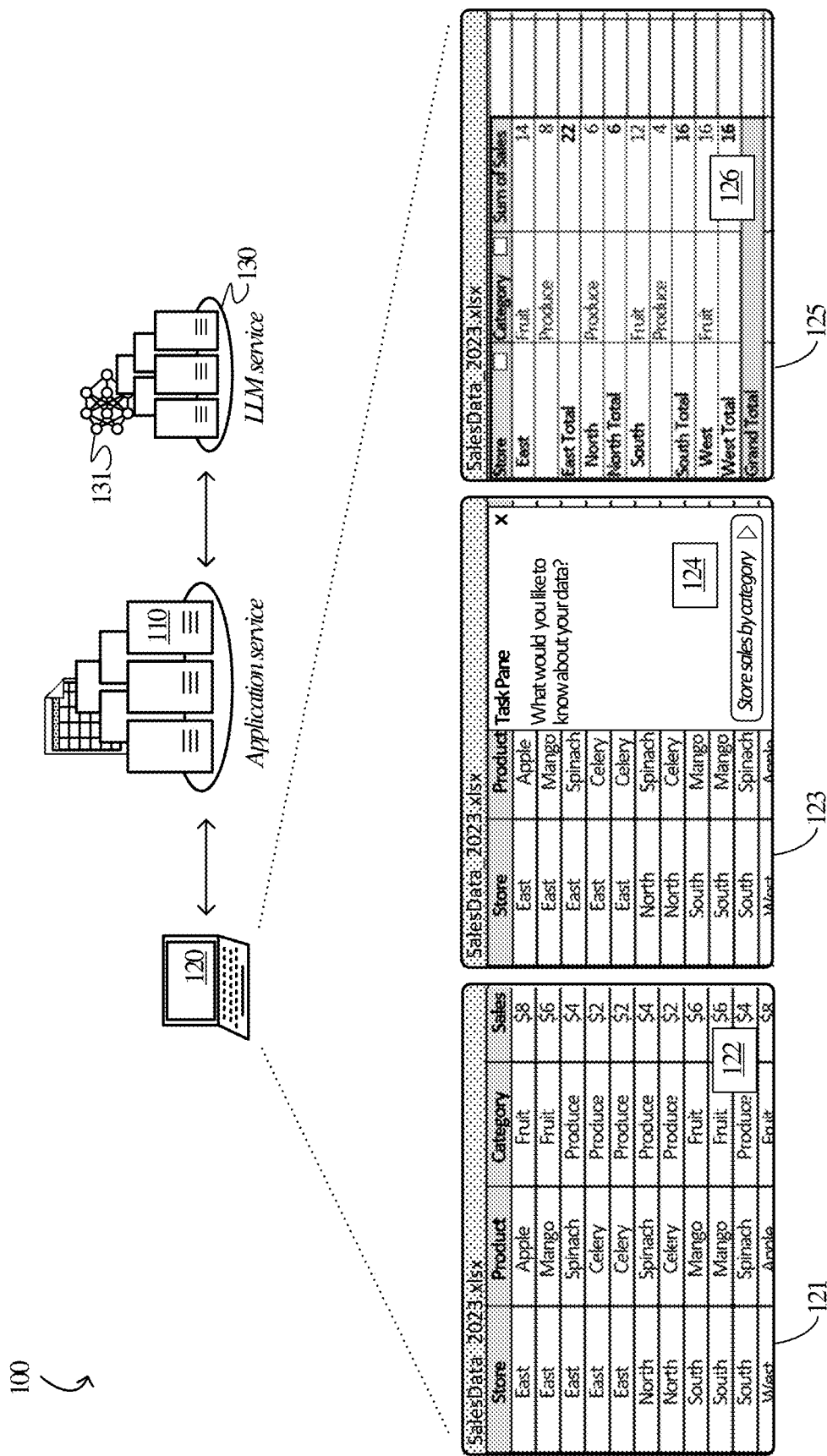
FIG. 1 illustrates an operational environment of an LLM integration for pivot tables in a spreadsheet environment in an implementation.

Various implementations are disclosed herein for an LLM integration for pivot tables in a spreadsheet environment or in productivity application environment capable of hosting a spreadsheet, data table, or the like. In an implementation, a spreadsheet application, implemented in software on one or more computing devices, receives a natural language (NL) input from a user associated with a spreadsheet hosted by the spreadsheet application. The user input relates to spreadsheet data hosted by the spreadsheet application. Upon receiving the natural language input, the application service generates a prompt that includes metadata associated with the spreadsheet and identifies a required format for the output, where the output is to include a description of a pivot table to be generated based on the spreadsheet data. The application service submits the prompt to the LLM service and receives a reply that includes a description of a pivot table which is responsive to the user's request. The application service generates the pivot table according to the reply of the LLM service in the spreadsheet.

In some implementations, the user may submit a follow-on query relating to the pivot table. The application service receives the query and generates a follow-on prompt for the LLM service to modify the pivot table in response to the query. Upon submitting the prompt and receiving the reply from the LLM service, the application service modifies the pivot table in the spreadsheet.

A pivot table of a spreadsheet application is a tool to summarize spreadsheet data, particularly large datasets. A pivot table may aggregate data to generate descriptive statistics about the data or perform other calculations, such as computing percentages from dimensioned data values. A pivot table may be configured to display a select subset of spreadsheet data according to a given parameter or characteristic to understand relations or identify patterns in the data.

In an implementation, the application service includes a pivot table engine which defines pivot tables according to a defined data structure, such as a structure organized according to a hierarchy of pivot table properties. Properties of a pivot table can include row variables, column variables, calculations or aggregations, and data filters. Rows and columns of a pivot table can include primary groupings and sub-groupings of data. For example, a pivot table summarizing sales data may include primary groupings relating to product categories, while the sub-groupings include the particular products of each category.

In various implementations, the prompt submitted to the LLM service includes rules which task the LLM service with generating its output in particular way. The rules can include a required format for the output, a rule which limits the LLM service to perform the task at hand and only the task (e.g., "do nothing more"), a rule which specifies the calculations or aggregations which are available to the LLM service in configuring a response that will service the user's input, and so on. A rule in the prompt may also specify the domain or scope of the response, such as constraining the LLM service to generate a response specifically for a particular spreadsheet application, such as for Microsoft Excel® as opposed to, say, Google Sheets. The prompt may also specify a rule which tasks the LLM service with generating multiple pivot tables options for presentation to the user, such as when the LLM service deems the user's query to be ambiguous or open to multiple interpretations. The prompts generated by the prompt engine of the application include rules may be tailored to promote or encourage the LLM service to produce its reply optimally in terms of latency, creativity, utility, coherence, while reducing the probability that the LLM service will, for example, digress or hallucinate (i.e., refer to or imagine things that do not actually exist) which can frustrate the user or further impair productivity.

In some scenarios, a prompt engine of the application service may generate a prompt for the LLM service based on a selected prompt template. The prompt template may be selected according to the nature of the user's input. For example, for an initial request by the user to create a pivot table, the prompt template may include tasks, examples, and rules appropriate for identifying and creating a pivot table. For a follow-on request from the user relating to an existing pivot table, the prompt template may include a description of the existing pivot table and tasks, examples, and rules for modifying it, such as to identify a modification to the pivot table and return a modified pivot table description in the same format as the supplied description. In some implementations, the prompt rules may selectively leverage the creativity of the LLM by specifying the temperature parameter for the LLM service in generating the response, such as specifying a lower temperature response for an initial pivot table request and specifying a higher temperature (for greater latitude in creativity) for subsequent requests.

The required format of the pivot table description specified in a prompt or in a prompt template may be a parse-able format by which the application can extract the relevant information and generate instructions for a pivot table engine of the application to generate the pivot table with little or no processing of the reply. For example, the required format of the output may be a JavaScript Object Notation (JSON) data structure, an extensible Markup Language (XML) syntax, or a data vector or array. In some implementations, the required format is a source code format which can be executed or interpreted by the pivot table engine of the application service.

In some implementations, a prompt template for a prompt to be submitted to the LLM service includes one or more examples of the required output format. For example, the required format may be a JSON data structure including pivot table properties and values. For the LLM service to configure a pivot table description or representation, the prompt may also supply spreadsheet metadata, such as row and column headers as well as other contextual information by which the LLM service can discern the user's intent and generate a pivot table responsive to that intent. For example, the prompt may include the document or filename or workbook page name. In some implementation, the prompt may also include a sample of the spreadsheet data.

Transformer models, of which LLMs are a type, are a class of deep learning models used in natural language processing (NLP) based on a neural network architecture which uses self-attention mechanisms to process input data and capture contextual relationships between words in a sentence or text passage. Transformer models weigh the importance of different words in a sequence, allowing them to capture long-range dependencies and relationships between words. GPT (Generative Pre-trained Transformer) models, BERT (Bidirectional Encoder Representations from Transformers) models, ERNIE (Enhanced Representation through kNowledge Integration), T5 (Text-to-Text Transfer Transformer), and XLNet models are types of transformer models which have been pretrained on large amounts of text data using self-supervised learning techniques such as masked language modeling. This pretraining allows the models to learn a rich representation of language that can be fine-tuned for specific NLP tasks, such as text generation, language translation, or sentiment analysis.

In some scenarios, the application service displays a task pane in the user interface of the spreadsheet application which includes a chat interface by which the application service can receive user-supplied natural language inputs and display responses to the inputs based on the replies generated by the LLM service. The task pane may also include graphical input devices by which the user can make selections, such as selecting one of multiple alterative suggestions generated by the LLM service. In some implementations, the application service may display suggestions generated by the LLM for types of pivot tables which may be of interest to the user based on the spreadsheet metadata prior to receiving a specific inquiry for a pivot table from the user. In some implementations, the application service displays a dialog box, such as a floating dialog box, an in-grid user interface box, or other graphical device or element by which to receive natural language input from the user and display natural language output based on an LLM service reply.

Technical effects may be appreciated from the technology disclosed herein which include simplified software development in that an LLM integration for pivot table generation reduces the need for developing complex deterministic coding for responding to the user inputs which can refer to any of a vast number of pivot table options and which may include imprecise language, incorrect terms, synonyms, misspellings, and so on.

Moreover, successfully creating pivot tables can be challenging for spreadsheet users of all levels. In this regard, technical effects of the disclosed technology include a streamlined user interface which creates and modifies pivot tables without the user having to navigate a complex and often confusing pivot table configuration panel, without presenting the user with a potentially confusing array of similarly sounding choices, and obviating trial-and-error by the user to find the optimal pivot table configuration. Further, a single user input can instigate multiple modifications to a pivot table rather than the user having to perform each action or modification individually.

Other technical advantages may be appreciated from the disclosed technology. The LLM integration of the application service tailors the prompt such that the LLM will produce its reply optimally in terms of latency, utility, coherence, and so on. Prompts tailored according to the disclosed technology reduce the amount of data traffic between the application service and the LLM for generating useful information for the user. For example, the disclosed technology streamlines the interaction between the user and the application service by keeping the LLM on task and reducing the incidence of erroneous, inappropriate, or off-target replies. The disclosed technology also promotes more rapid convergence, that is, reducing the number of interactions with the LLM to generate a desired result.

In addition, the disclosed technology focuses the generative activity of the LLM to improve the performance of the LLM without overwhelming the LLM (e.g., by exceeding the token limit). For example, the disclosed technology balances prompt size (e.g., the number of tokens in the prompt which must be processed by the LLM) with providing sufficient information to generate a useful response.

Other technical benefits accruing from streamlined interaction, more rapid convergence, and optimized prompt sizing include reduced data traffic, faster performance by the LLM, reduced latency, and concomitant improvements to productivity costs and to the user experience.

Turning now to the Figures, FIG. 1 illustrates operational environment 100 in an implementation. Operational environment 100 includes application service 110, computing device 120, and LLM service 130. Application service 110 hosts a productivity application such as a spreadsheet application (e.g., Microsoft Excel®) to endpoints such as computing device 120 which execute a spreadsheet application that provides a local user experience and that interfaces with application service 110. The application hosted by application service 110 may be implemented in software on one or more computing devices, running locally with respect to computing device 120 may be natively installed and executed applications, browser-based applications, mobile applications, streamed applications, or any other type of application capable of interfacing with application service 110 and providing a user experience, such as the user experiences 121, 123, and 125. The spreadsheet environment of application service 110 may be implemented a natively installed and executed application, a browser-based application, or a mobile application, and may execute in a stand-alone manner, within the context of another application such as a presentation application or word processing application, with a spreadsheet functionality, or in some other manner entirely.

Figure 10:
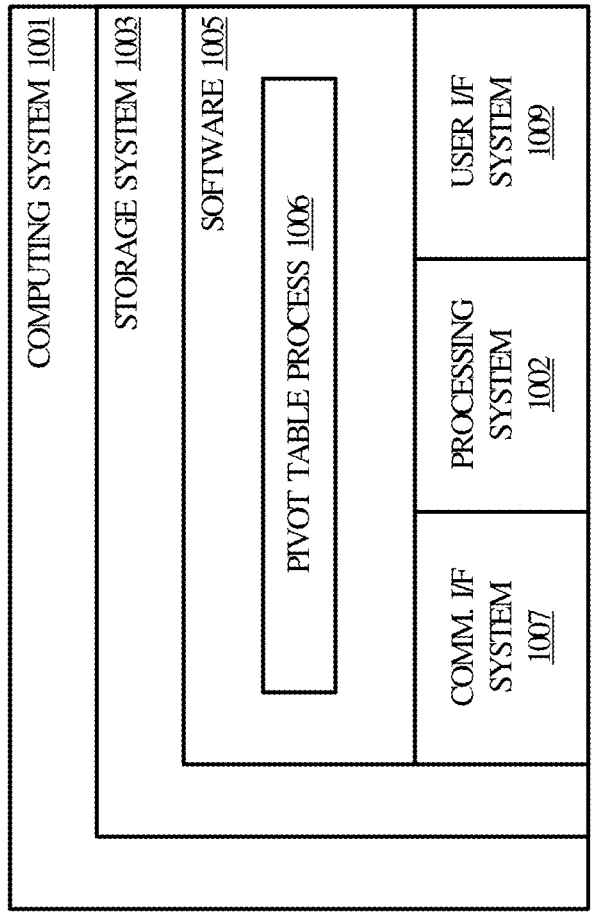
FIG. 10 illustrates a computing system suitable for implementing the various operational environments, architectures, processes, scenarios, and sequences discussed below with respect to the other Figures.

Computing device 120 is representative of a computing device, such as a laptop or desktop computer, or a mobile computing device, such as a tablet computer or cellular phone, of which computing device 1001 in FIG. 10 is broadly representative. Computing device 120 communicates with application service 110 via one or more internets and intranets, the Internet, wired or wireless networks, local area networks (LANs), wide area networks (WANs), and any other type of network or combination thereof. A user interacts with the spreadsheet application of application service 110 via a user interface of the application displayed on computing device 120. User experiences 121, 123, and 125, including task pane 124, are representative of user experiences of a spreadsheet environment of a productivity application hosted by application service 110 in an implementation.

Application service 110 is representative of one or more computing services capable of hosting a productivity application such as a spreadsheet application and interfacing with computing device 120 and with LLM service 130. Application service 110 may be implemented in software in the context of one or more server computers co-located or distributed across one or more data centers. In an implementation, application service 110 may include functionalities such as a pivot table engine for generating pivot tables based on spreadsheet data and a prompt engine for generating prompts relating to pivot tables for LLM service 130.

LLM service 130 is representative of one or more computing services capable of hosting an LLM computing architecture and communicating with application service 110. LLM service 130 may be implemented in the context of one or more server computers co-located or distributed across one or more data centers. LLM service 130 hosts LLM 131 which is representative of a deep learning AI transformer model, such as GPT-3®, GPT-3.5, ChatGPT®, GPT-4, BERT, ERNIE, T5, XLNet, and the like. LLM service 130 is integrated with the spreadsheet environment associated with application service 110 according to the technology disclosed herein.

In operation, the user of computing device 120 interacts with application service 110 via user experiences 121, 123, and 125. User experience 121 illustrates a spreadsheet hosted by application service 110, including data table 122 with multiple rows and columns of data. In user experience 123, task pane 124 is displayed in the spreadsheet environment. The user keys in a natural language statement or inquiry ("Store sales by category") into task pane 124. Application service 110 receives the natural language input from task pane 124 and selects a prompt template by which to create a prompt based on the user's statement and/or previous interactions with LLM service 130, if any. Application service 110 includes in the prompt spreadsheet metadata, such as the filename and the column headers of data table 122. In some instances, application service 110 may include a sample of spreadsheet data, such as the first five rows of data. Application service 110 submits the prompt to LLM service 130. LLM 131 generates a reply to the prompt including a description of a suggested pivot table based on the user's query and the spreadsheet metadata. The description of the suggested pivot table is formatted by LLM 131 according to a formatting rule and/or one or more example output formats provided in the prompt. LLM service 130 sends the reply to application service 110.

Upon receiving the reply from LLM service 130, application service 110 configures pivot table 126 based on a description provided in the reply and displays pivot table 126 in a workbook page of the spreadsheet as illustrated in user experience 143. The user may, in response to viewing pivot table 126 submit follow-on queries to modify or adjust pivot table 126. In response to the follow-on queries, application service 110 may generate follow-on prompts for LLM service 130 including a description of the most recent configuration of pivot table 126. The description of pivot table 126 provided in the prompt may be presented to LLM 131 as an example of how a suggested modification of pivot table 126 should be configured in its reply.

Notably, application service 110 may execute a specific-purpose AI model, such as Microsoft Excel Insights, independent from the integration of LLM service 130 in the spreadsheet environment. Inquiries submitted by the user to the specific-purpose AI model may execute in parallel with the application service methods disclosed herein. For example, a user may use Insights to generate a chart relating to data table 122 in the spreadsheet environment, where the chart is generated by Insights based on the entirety of data table 122. In addition to and in parallel with the interaction with Insights, the user may submit input in task pane 124 causing application service 110 to generate and send a prompt to LLM service 130 which includes a portion of data table 122, such as the first 3-5 rows or particular columns of data.

Figure 2:
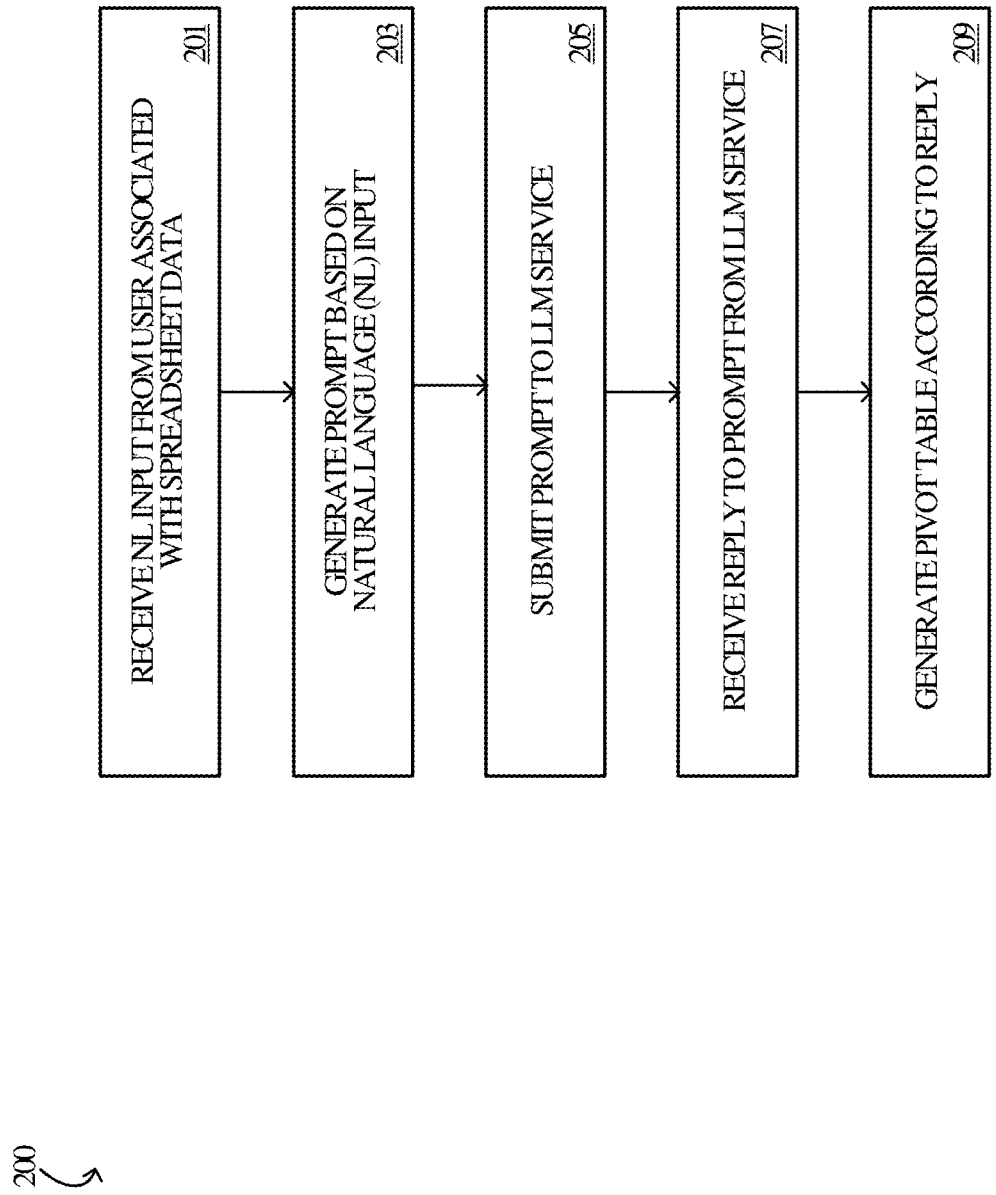
FIG. 2 illustrates a method of operating an application service with an LLM integration for pivot tables in an implementation.

FIG. 2 illustrates a method of operation for an LLM integration for pivot tables in a spreadsheet environment in an implementation, herein referred to as process 200. Process 200 may be implemented in program instructions in the context of any of the software applications, modules, components, or other such elements of one or more computing devices. The program instructions direct the computing device(s) to operate as follows, referred to in the singular for the sake of clarity.

A computing device hosts a productivity application such as a spreadsheet application and displays a user interface for the application. The computing device interfaces with an LLM service based on inputs received from the user. In an implementation, the computing device receives a natural language input from the user relating to spreadsheet data (step 201). In an implementation, the spreadsheet data is hosted by the spreadsheet application and displayed in the user interface of the computing device. A user associated with the spreadsheet keys in a natural language input in a task pane or chat interface in the user interface referencing a table of spreadsheet data in the spreadsheet. The data table may be organized according to column headers and/or row headers in the spreadsheet.

The computing device generates a prompt for the LLM service based on the input (step 203). In an implementation, the prompt includes spreadsheet metadata, such as column headers, row headers, a document or filename, a sheet name, and so on. The prompt may also include contextual information, such as a chat history with the LLM service and a portion of the spreadsheet data. The prompt may also include rules which direct the LLM service to identify a pivot table configuration responsive to the user input and to generate a description of the pivot table. The prompt may also task the LLM service with configuring or formatting the description of the pivot table in a parse-able output format, that is, in a format which facilitates extracting the components of the reply based on information type. The parse-able output format can include enclosing elements of the reply in tags (e.g., semantic tags such as <suggestion> and </suggestion>, <description> and </description>, etc.), as a JSON data object, or in another data structure.

Having configured a prompt based on the user input, the computing device submits the prompt to the LLM service (step 205). For example, the computing device may communicate with (e.g., send prompts to and receive replies from) the LLM service via an application programming interface (API) hosted by the LLM service. The computing device receives a reply to the prompt from the LLM service (step 207). In an implementation, the reply to the prompt includes a description of a pivot table generated based on the prompt formatted according to formatting rules and/or sample pivot table descriptions provided in the prompt.

Having received a reply to the prompt from the LLM service, the computing device generates a pivot table based on the reply (step 209). In an implementation, the reply from the LLM service includes a description of a pivot table formatted as a JSON data object. The computing device extracts elements of the pivot table from the description and creates source code or commands by which a pivot table engine of the computing device generates the pivot table. The pivot table generated by the pivot table engine is then displayed in the user interface of the spreadsheet application.

Referring once again to FIG. 1, operational environment 100 includes a brief example of process 200 as employed by application service 110 with respect to input received from computing device 120 and to replies received from LLM service 130.

In operational environment 100, a user at computing device 120 submits an inquiry to application service 110 which relates to a spreadsheet of a productivity application hosted by application service 110 and displayed in a client application or in a browser-based application on computing device 120. The input includes a query relating to spreadsheet data in the spreadsheet and is provided in natural language, that is, as if the user is speaking to another person.

Application service 110 receives the input and generates a prompt to be submitted to LLM service 130 based on user's query. The prompt includes spreadsheet metadata and may also include contextual information, such as a chat history or interaction with the LLM service, and/or a subset of the data, e.g., the first five or ten rows of data from data table 122. In the prompt provided to LLM service 130, application service 110 may specify tasks to be performed by LLM service 130, such as generating descriptions of pivot tables in a required output format in the reply. To instruct LLM service 130 in the required output format, the prompt may include one or more samples of output in the required format. In an implementation, the required format of the descriptions of pivot tables is a JSON object of parameter-value pairs with the parameters corresponding to various properties or characteristics of pivot tables. In some scenarios, the prompt may specify a range of values for a property or characteristic of the pivot table.

Next, application service 110 submits the prompt to LLM service 130. LLM service 130 generates a reply to the prompt including a description of a pivot table generated by LLM 131 and transmits the reply to application service 110. The description of the pivot table is configured by LLM 131 according to the user's query and is formatted in the required format.

Application service 110 receives the reply from LLM service 130 and generates pivot table 126 based on the reply. To generate pivot table 126, application service 110 parses the reply to identify and extract properties or characteristics of pivot table 126. Based on the identified characteristics, application service 110 identifies or configures source code or commands by which to create pivot table 126 in the spreadsheet. In an implementation, the required format is JSON object including parameter-value pairs, wherein each parameter corresponds to a characteristic or property of a pivot table. With commands identified based on the JSON object, application service 110 carries out the commands to create pivot table 126.

Pivot table 126 generated by LLM 131 is displayed by application service 110 in the spreadsheet in user experience 125 of the spreadsheet application. In some implementations, application service 110 may also display a natural language response in task pane 124 presenting or describing the pivot table to the user.

Continuing the exemplary scenario, as pivot table 126 is displayed, the user may submit a subsequent input relating to pivot table 126 or data table 122. Application service 110 generates a subsequent prompt based on the subsequent input and submits the subsequent prompt to LLM service 130. LLM service 130 returns a subsequent reply based on the subsequent prompt which includes a modification to pivot table 126 responsive to the subsequent input. The modification may be configured in the reply according to the required format specified in the subsequent prompt. For example, the subsequent prompt may specify that the output from LLM 131 be configured in the same way as the description of pivot table 126 supplied in the prompt, i.e., a JSON data object.

Figure 3:
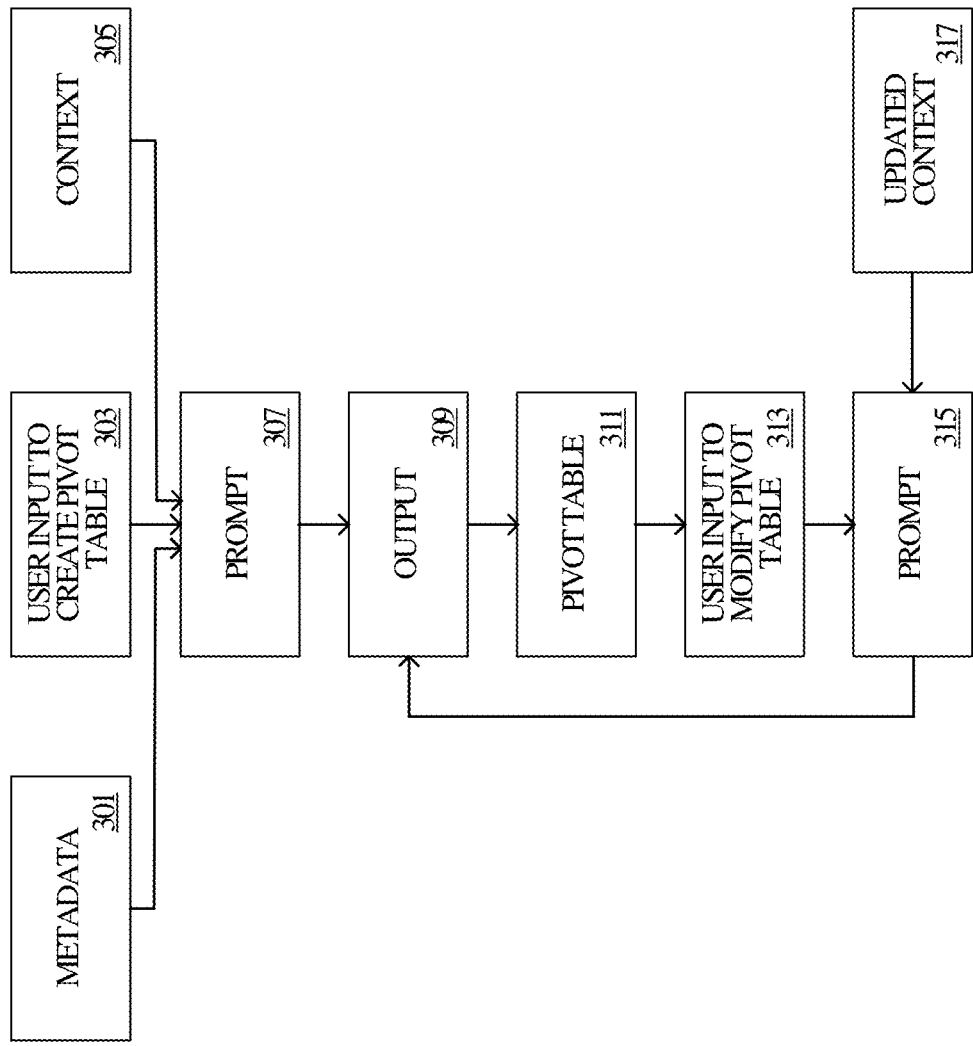
FIG. 3 illustrates a workflow for creating and modifying pivot tables in a spreadsheet environment in an implementation.

Turning now to FIG. 3, FIG. 3 illustrates workflow 300 for operating an LLM integration for creating and modifying a pivot table based on spreadsheet data in an implementation. In an implementation, an application service hosting an application executing on a user computing device performs workflow 300. The application service includes a prompt engine and pivot table engine which perform steps of workflow 300. The application displays a user interface on the computing device, including spreadsheet data and a task pane for receiving user input and displaying response to the input. The spreadsheet data may be configured as a data table in the spreadsheet.

In workflow 300, prompt 307, which is representative of a prompt for submission to an LLM model such as a GPT model, is configured by a prompt engine of an application service including metadata input 301, user input 303 and context information 305. In an implementation, metadata input 301 includes data-related information such as row and/or column headers, row and/or column data types, table headers, sheet names, workbook titles, document or filenames, and so on. User input 303 includes a user query submitted by a user in the task pane of the user interface. Context information 305 can include a sample of the spreadsheet data relating to the user's query. Context information 305 may also include previous interactions with an LLM service with regard to the spreadsheet data.

The prompt engine submits prompt 307 to an LLM of an LLM service and receives output 309 based on prompt 307. output 309 includes a description of pivot table 311 in a parse-able format. The prompt engine identifies and extracts properties or characteristics of a pivot table from output 309 according to the parse-able format. The prompt engine generates commands based on the identified pivot table characteristics which are used by the pivot table engine to create pivot table 311.

The pivot table engine creates pivot table 311 and displays pivot table 311 in the user interface of the application executing on the user computing device. The application service receives, via the task pane, follow-on user input 313 relating to pivot table 311. Follow-on user input 313 includes a request or query to modify or adjust pivot table 311, such as keying in "Move year to columns" in the user interface. The prompt engine generates prompt 315 based on follow-on user input 313 and a description of pivot table 311 in the parse-able format received in output 309. The prompt engine also includes updated context information 317 in prompt 315, such as the user's previous inputs. The prompt engine submits prompt 315 to the LLM of the LLM service and receives new output 309.

From output 309, workflow 300 can cycle through creating an updated pivot table 311, receiving follow-on user input 313 to modify pivot table 311 and create new follow-on prompts 315 with updated context 317.

Figure 4:
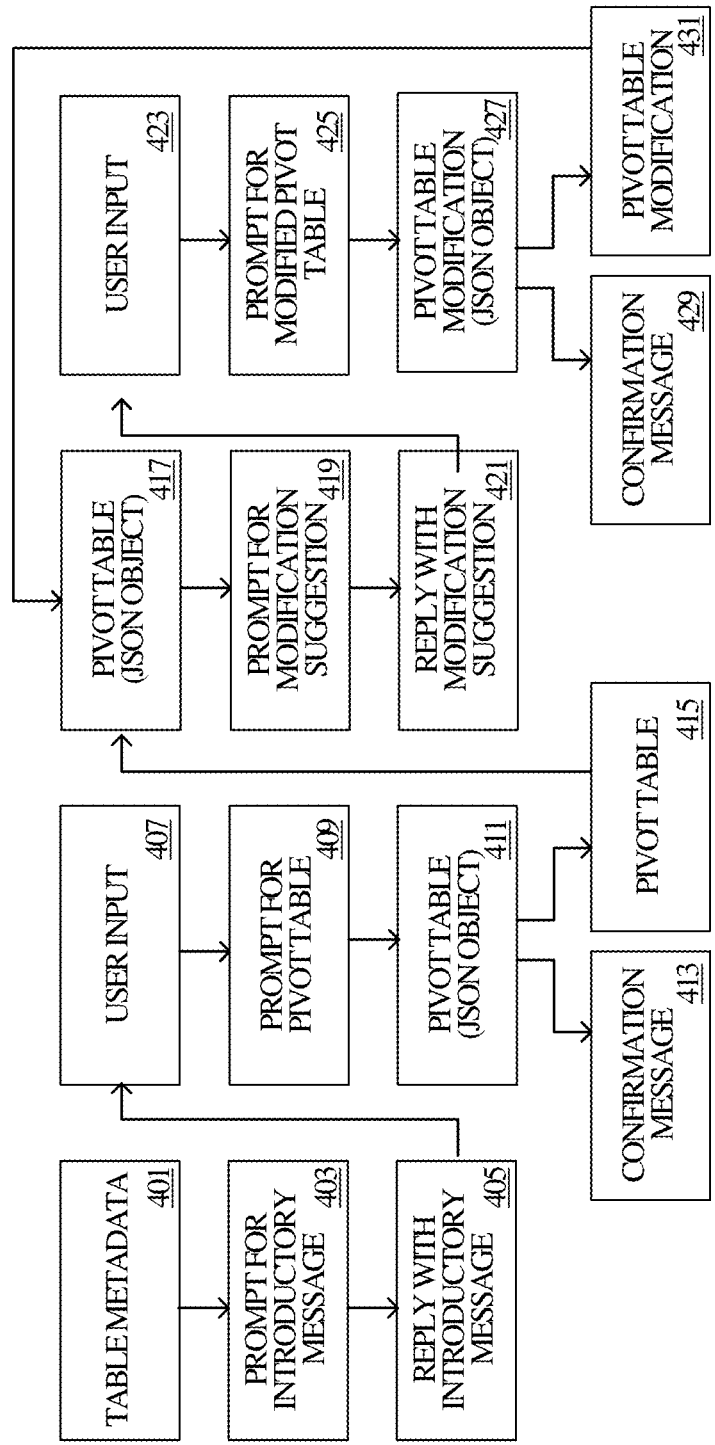
FIG. 4 illustrates a workflow for creating and modifying pivot tables in a spreadsheet environment in an implementation.

FIG. 4 illustrates workflow 400 for operating an LLM integration for creating and modifying a pivot table based on spreadsheet data in an implementation. In an implementation, an application service hosting an application executing on a user computing device performs workflow 400. The application service includes a prompt engine and pivot table engine which perform steps of workflow 300. The application displays a user interface on the computing device, including spreadsheet data and a task pane for receiving user input and displaying response to the input. The spreadsheet data may be configured as a data table in the spreadsheet.

In workflow 400, a prompt engine of the application service receives table metadata 401 associated with a table of spreadsheet data including row and/or column headers, row and/or column data types, table headers, sheet names, workbook titles, document or filenames, and so on. The prompt engine configures prompt 403 tasking the LLM of an LLM service with composing an introductory message addressed to the user with suggestions for different types of analyses that could be performed on the data table. The LLM returns reply 405 to the prompt engine based on table metadata 401 which includes an introductory message with one or more suggestions for the user. The prompt engine configures a response based on reply 405 for display in the task pane of the user interface of the application. For example, the response may include a graphical input device (e.g., button or hyperlink) for each suggestion received in reply 405 which the user can select to implement a suggestion.

Subsequent to displaying a response based on reply 405, the prompt engine receives user input 407 in the task pane including a natural language query relating to the data table (e.g., "What was the top selling product in 2022?"). User input 407 may also be a selection of a suggestion, such as a suggestion for a type of data analysis, which is presented in conjunction with the introductory message. The prompt engine generates prompt 409 including user input 407 along with table metadata 401. Prompt 409 tasks the LLM with generating a pivot table, based on data from the data table, which is responsive to user input 407. Prompt 409 also tasks the LLM with generating a description of the pivot table in the form of a JSON data object.

Upon submitting prompt 409 to the LLM, the prompt engine receives a JSON representation 411 of a pivot table generated by the LLM in response to prompt 409. The prompt engine generates confirmation message 413 for display to the user in the task pane which includes the name of pivot table 415 as extracted from the JSON representation 411. The prompt engine also identifies or configures commands by which the pivot table engine of the application service generates a display of pivot table 415 in the user interface.

Subsequent to displaying pivot table 415 in the user interface, the prompt engine generates prompt 419 including JSON representation 417 of the most current version or iteration of pivot table 415. Prompt 419 tasks the LLM with generating suggestions for ways to adjust or modify pivot table 415 based at least on JSON representation 417. Prompt 419 may also include context information (not shown) relating to the data table or spreadsheet.

Upon submitting prompt 419 to the LLM, the prompt engine receives reply 421 including one or more suggestions for modifying pivot table 415. The prompt engine configures and displays a response to the user in the task pane based on reply 421. For example, the prompt engine may configure graphical input devices (e.g., buttons or hyperlinks) which the user can select to implement the suggestion.

The prompt engine receives user input 423, which may be a text-based input keyed in by the user or a selection of a suggestion, to modify pivot table 415 in a particular way from reply 421. The prompt engine generates prompt 425 including user input 423 and JSON representation 417 of the current pivot table. In response to submitting prompt 425 to the LLM, the prompt engine receives JSON representation 427 including modifications to one or more characteristics or properties of the current pivot table. For example, JSON representation 427 may be a JSON object of one or more property-value pairs including updated values for pivot table properties identified by the LLM in response to prompt 425.

The prompt engine implements JSON representation 427 by updating the pivot table according to pivot table modification(s) 431 and displaying confirmation message 429 to the user regarding the pivot table modification(s) 431 in the task pane. For example, the LLM may be tasked with providing a description of modification(s) 431 which is then presented in confirmation message 429.

Subsequent to implementing pivot table modification(s) 431, workflow 400 continues with configuring updated JSON representation 417 of the current pivot table, generating prompt 419 for new modification suggestions to be presented to the user, and so on.

Figure 5:
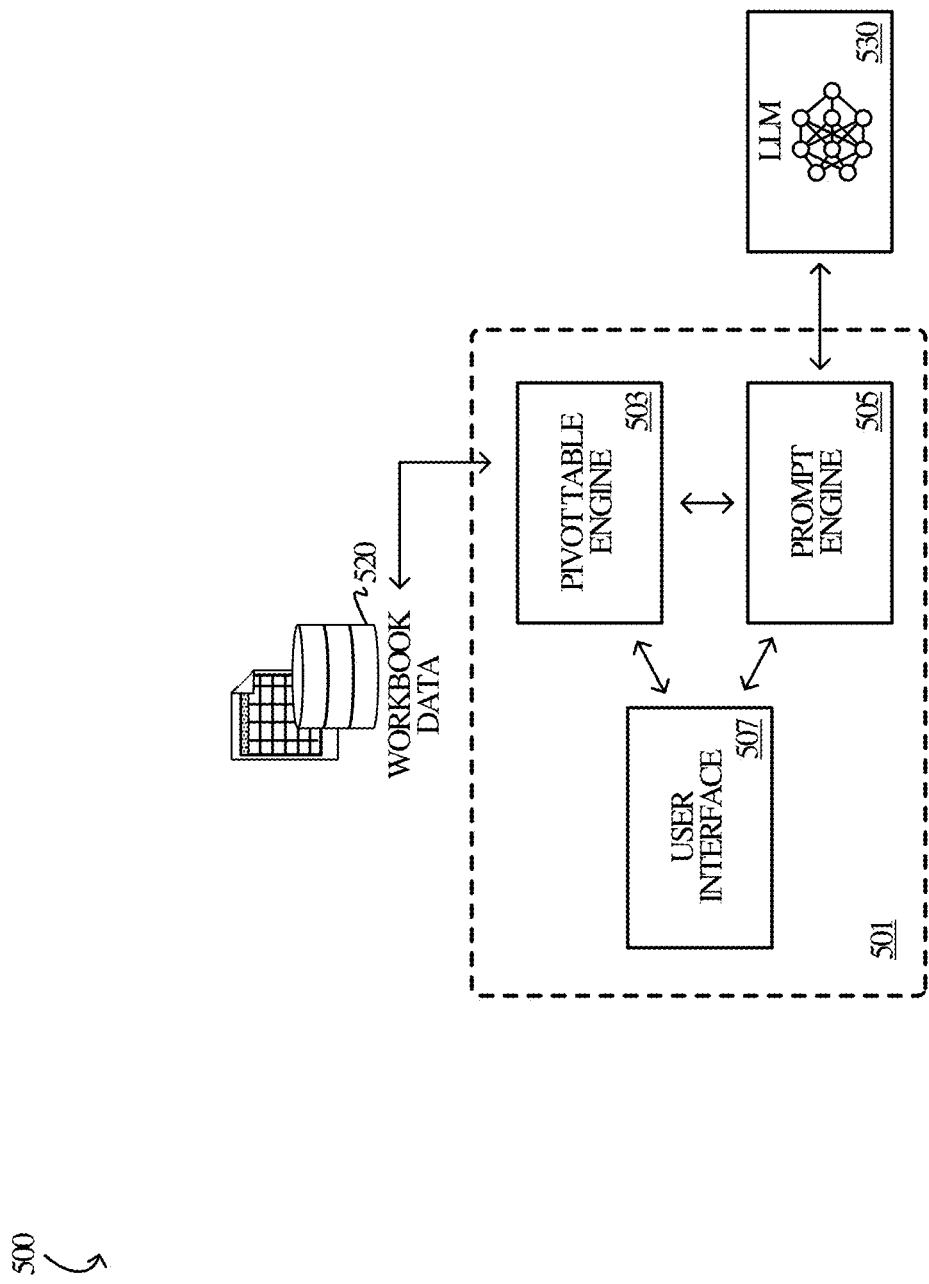
FIG. 5 illustrates a systems architecture for an LLM integration for pivot tables in a spreadsheet environment in an implementation.

Turning now to FIG. 5, FIG. 5 illustrates system architecture 500 including application 501, workbook data 520, and LLM 530. Application 501, of which application service 110 is representative, includes pivot table engine 503, prompt engine 505, and user interface 507. Application 501 may also include other components, engines, and modules of a spreadsheet application, such as computational engines, charting engines, macro engines, Visual Basic modules, formatting components, etc. Application 501 displays workbook data 520 in user interface 507 and receives user input relating to workbook data 520 from user interface 507. Prompt engine 505 of application 501 generates prompts for LLM 530 based on user input received from a user through user interface 507 and receives replies to the prompts from LLM 530.

FIGS. 6A-6E illustrate operational scenario 600 of an LLM integration for pivot tables in a spreadsheet environment and referring to elements of FIG. 5 in an implementation. In operational scenario 600, user interface 601 of a spreadsheet application displays data table 602 including sales data for various kinds of produce at various stores.

Figure 6B:
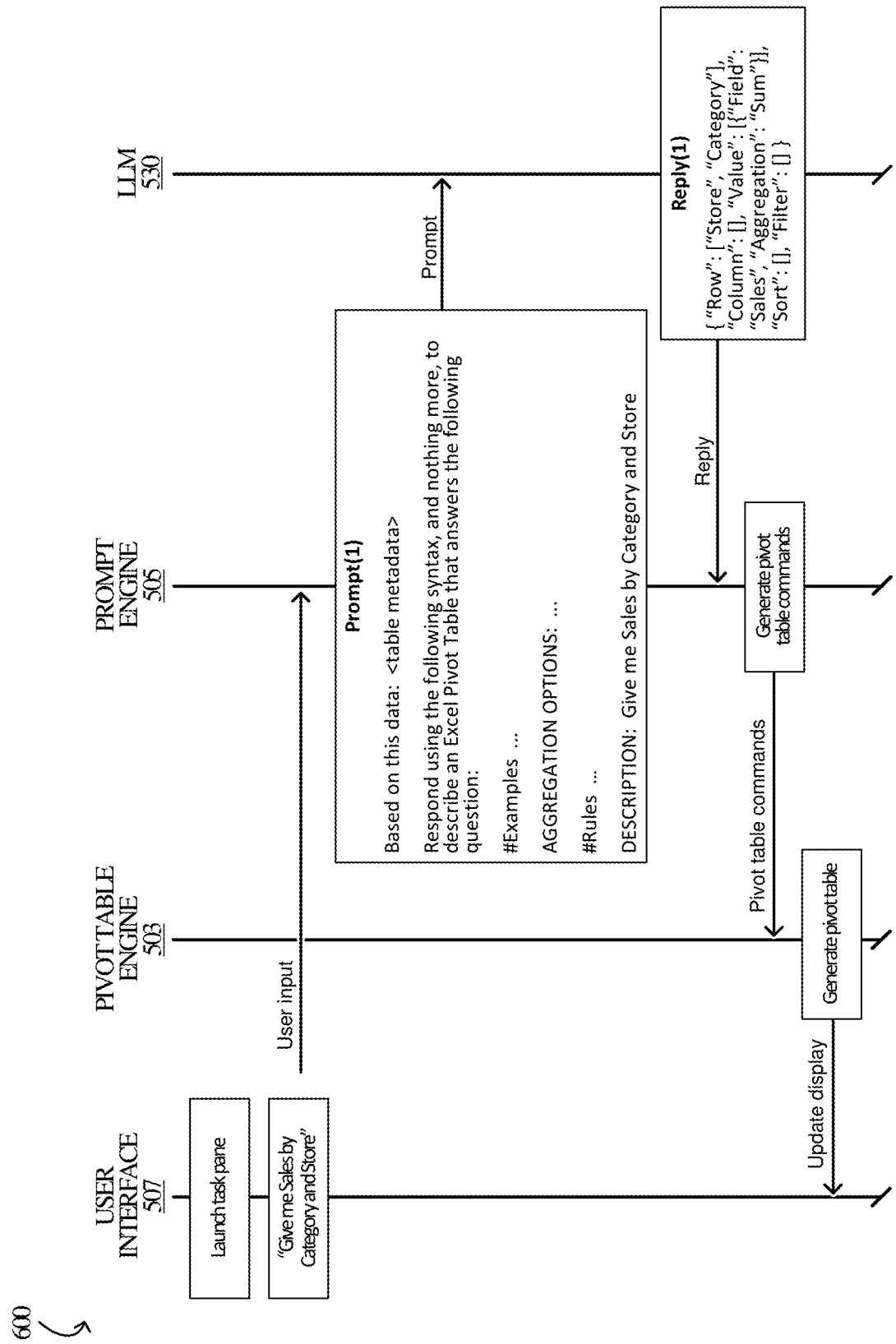

In operational scenario 600 of FIG. 6B, the spreadsheet application launches a task pane in user interface 507. The task pane may be launched by application 501 automatically when application 501 launches or when the spreadsheet is opened, or the task pane may be launched in response to user input. In the task pane, application 501 receives a natural language input from a user via the task pane of user interface 507. The input may be a text entry keyed into a textbox of the task pane by the user or a spoken communication from the user captured by a microphone on the user computing device and which is translated to text by a speech-to-text engine. The input includes a request or query regarding workbook data 520: "Give me Sales by Category and Store." Prompt engine 505 receives the user input from user interface 507 and configures a Prompt(1) based at least on the user input.

To configure Prompt(1), prompt engine 505 identifies a prompt template according to the type of request in the input (e.g., whether the user input relates to an existing pivot table) in an implementation. Prompt(1) includes a table metadata from workbook data 520, rules for generating a pivot table, examples for configuring a representation or description of a pivot table, and the user input. Prompt engine 505 submits Prompt(1) to LLM 530 and receives Reply(1) in response.

Reply(1) is generated by LLM 530 based on Prompt(1), including a JSON description of a pivot table. Upon receiving Reply(1) from LLM 530, prompt engine 505 generates pivot table commands for execution by pivot table engine 503 based on the JSON description. In an implementation, to generate the pivot table commands, prompt engine 505 parses Reply(1) to identify characteristics and values of the characteristics for a pivot table to be created. To generate the pivot table commands, prompt engine 505 identifies commands for configuring the pivot table according to characteristics identified in the JSON description and the values assigned to the characteristics in the JSON description. Prompt engine 505 sends the pivot table commands to pivot table engine 503 for execution. Pivot table engine 503 generates a pivot table according to the pivot table commands and configures an update for user interface 507 including instructions for displaying the pivot table. FIG. 6C illustrates the pivot table generated according to pivot table commands derived from the JSON description in Reply(1).

Figure 6D:
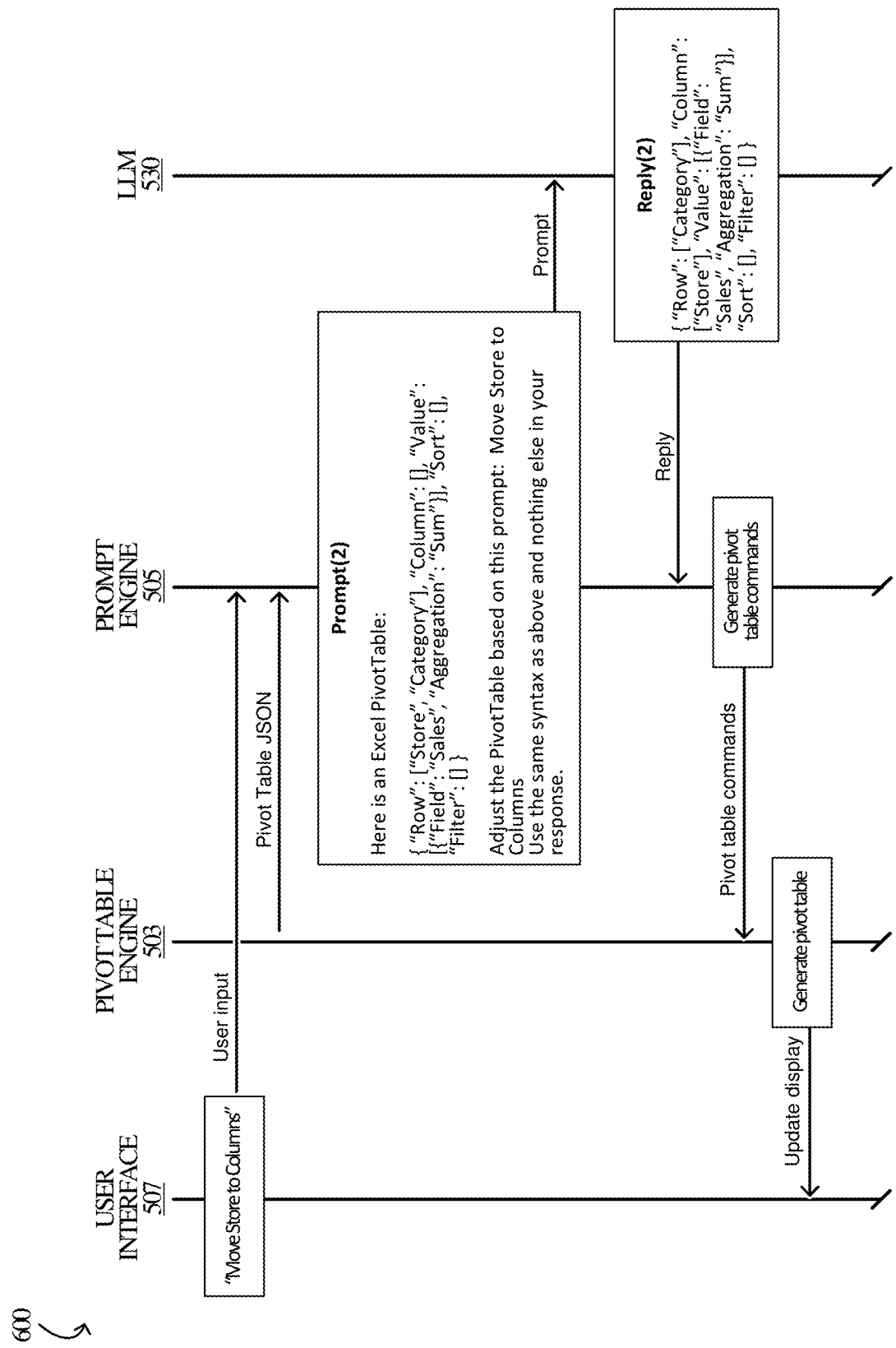

Continuing operational scenario 600 in FIG. 6D, the task pane of user interface 507 receives a second input from a user: "Move Store to Columns." User interface 507 sends the user input to prompt engine 505 for configuring a second prompt to LLM 530.

To configure Prompt(2), prompt engine 505 selects a template corresponding to modifying an existing pivot table. According to the selected template, prompt engine 505 receives a JSON description of the current pivot table from pivot table engine 503. In some scenarios, prompt engine 505 may store the JSON description received from Reply(1) for reuse in subsequent prompts. However, by receiving the JSON description from pivot table engine 503 for the current revision of the pivot table, the JSON description will include any changes to the pivot table that may have been performed by the user directly.

Figure 6E:
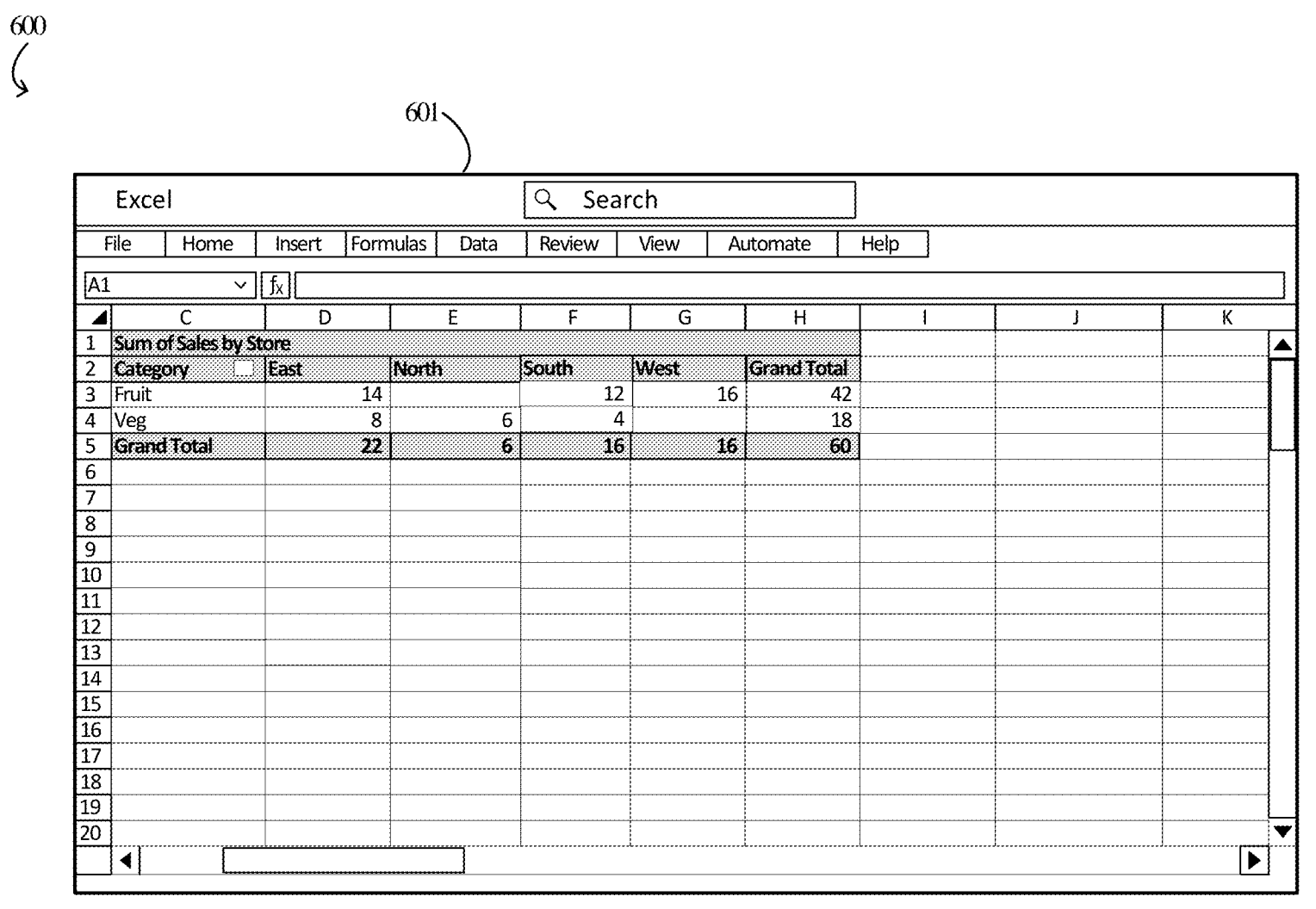

Continuing with FIG. 6D, prompt engine 505 submits Prompt(2) to LLM 530 and receives, in response, Reply(2). Reply(2) includes a JSON description of a modification to the current pivot table, including changing the values of the Row characteristic from "Store" and "Category" to just "Category," and adding the value "Store" to the Column characteristic. Upon receiving Reply(2), prompt engine 505 identifies commands based on the changes to the Row and Column characteristics and sends the commands to pivot table engine 503. Pivot table engine 503, in turn, generates an updated pivot table based on the commands and configures an update for user interface 507 including instructions for displaying the updated pivot table. FIG. 6E illustrates the updated pivot table in user experience 601.

FIGS. 7A-7E illustrate operational scenario 700 of an LLM integration with a spreadsheet environment of an application, such as a spreadsheet application, and referring to elements of FIG. 5 in an implementation. In operational scenario 700 of FIG. 7A, an application, implemented on a computing device such as a laptop computer, displays user experience 701 including data table 702 and task pane 703. Task pane 703 may be surfaced in user experience 701 when, for example, the user selects an LLM integration component from a drop-down menu of application components, plug-ins, and the like. In some scenarios, task pane 703 may be surfaced automatically with another operation associated with the application, such as when the application launches or when the spreadsheet document being opened.

In task pane 703, the application displays introductory messages to the user. The introductory messages may be generated by an LLM based on a prompt from the application based on table metadata and other contextual information. In task pane 703 the application receives user input including a query about data table 702 ("What are the sales for each product?"). In response to the query, the application generates a prompt for the LLM to generate a pivot table which will be responsive to the user's query. The prompt, based on a prompt template, includes the table metadata (i.e., column headers, filename, sheet name or table name if any, etc.) and may also include contextual information (e.g., user interactions with data table 702, previous queries, if any, etc.). The prompt specifies that the response from the LLM is to be formatted as JSON object which describes the recommended pivot table in terms of pivot table properties or characteristics and their respective values. To specify the format, the prompt includes one or more examples of pivot table descriptions in a JSON object format.

Figure 7A:
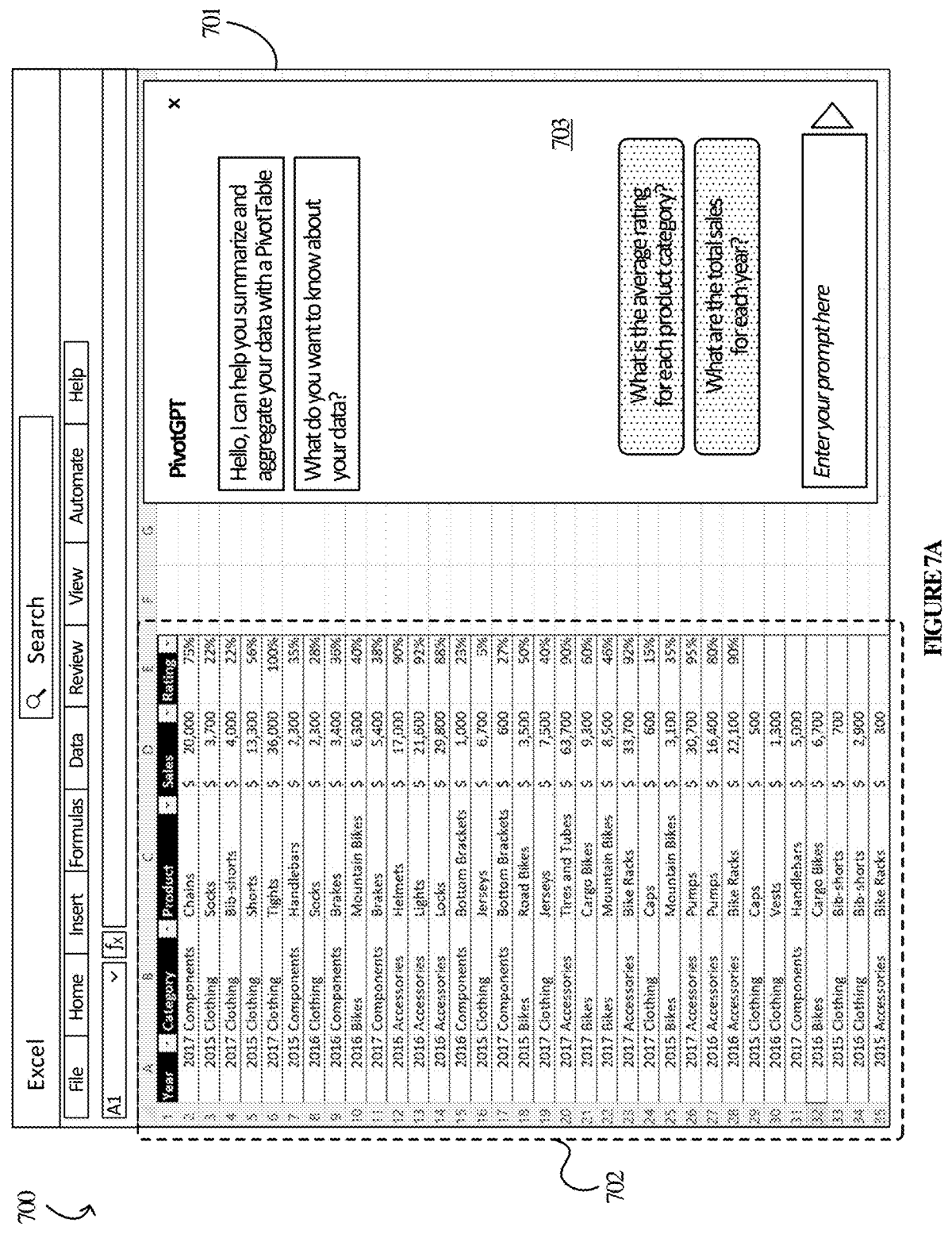
Figure 7C:
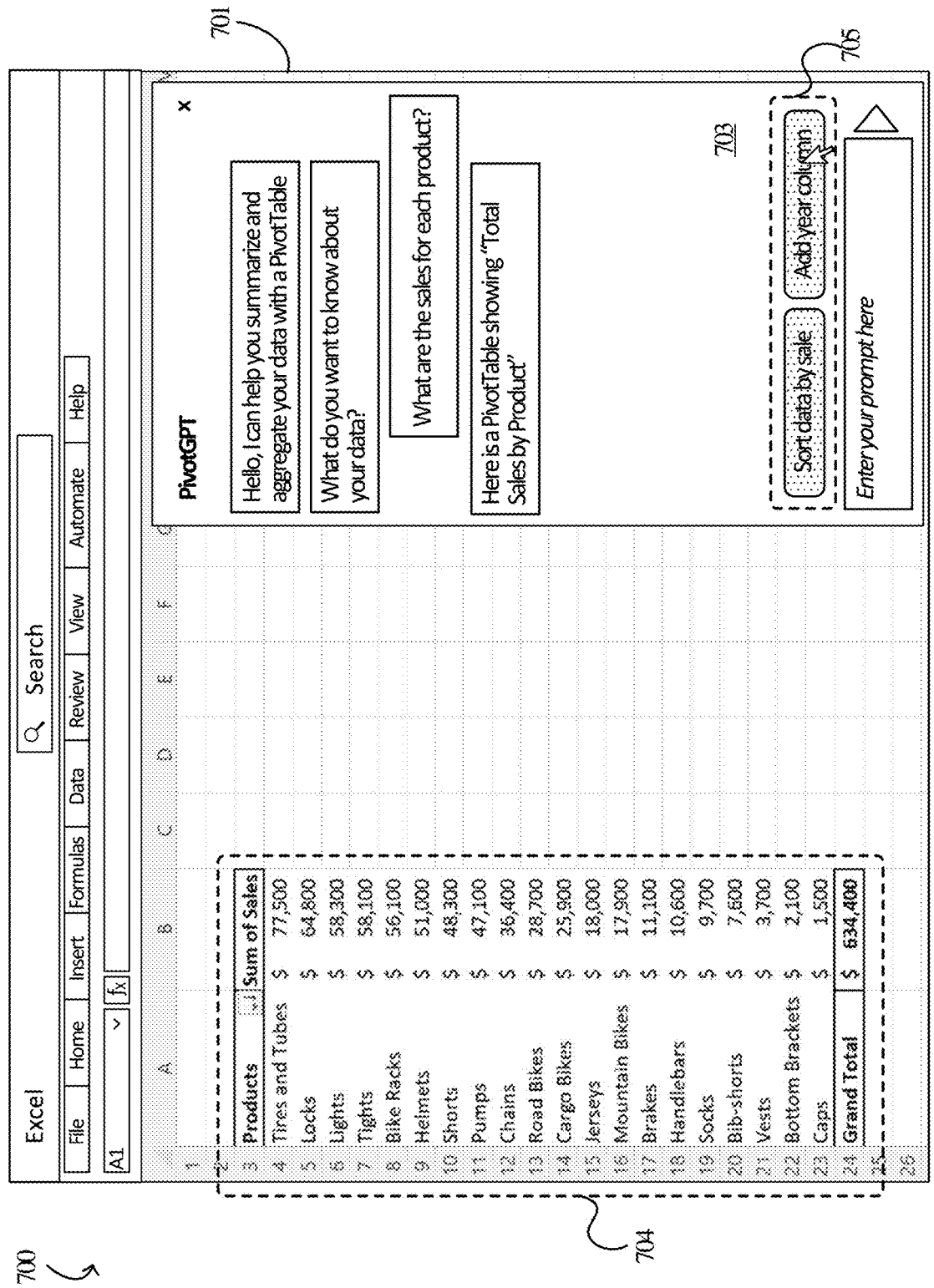

Continuing operational scenario 700 in FIG. 7C, user experience 701 displays pivot table 704 based on the prompt submitted by the application. In task pane 703, the application displays a confirmation message presenting pivot table 704 to the user. Also in task pane 703, the application displays suggestions 705 for adjustments or modifications to pivot table 704. Suggestions 705 are derived from a reply from the LLM based on a prompt sent by the application to the LLM requesting suggestions to be presented to the user of ways to modify pivot table 704. The application receives the reply and configures suggestions 705 as graphical input devices which, when selected by the user, will trigger a follow-on prompt to be generated and sent to the LLM for response. In FIG. 7C, the user selects the suggestion "Add year column."

Figure 7D:
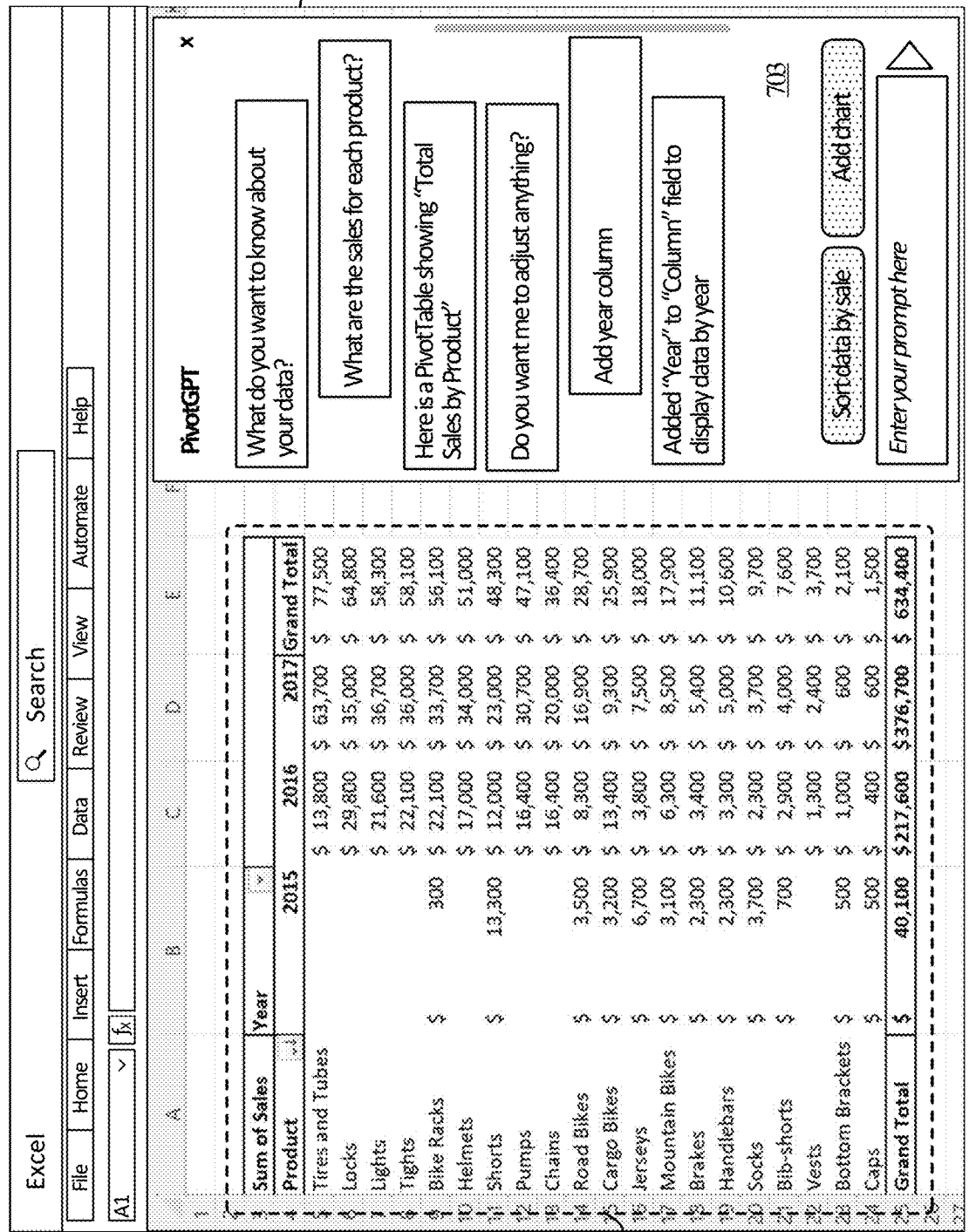

Based on the user selection of the suggestion "Add year column," the application generates a follow-on prompt for the LLM. The follow-on prompt includes a description of pivot table 704 in the form of a JSON object. The follow-on prompt tasks the LLM with modifying the pivot table according to the suggestion and returning the modification in the form of a JSON object including the characteristics to be modified and updated values for those characteristics. In FIG. 7D, updated pivot table 706 is displayed in user experience 701 including product sales displayed by the year for a more granular summary of the source data. In task pane 703, the user input that was received and a confirmation message is displayed describing the action that was taken. Task pane 703 also displays suggestions for additional modifications that the user may be interested in.

FIG. 8 illustrates prompt templates 801 and 802 for prompts relating to pivot table creation and modification, respectively, in an implementation. To use template 801, the application service, or a prompt engine of an application service, selects template 801 based on the nature of the user's query. For example, where the application service determines that the user's query relates to analyzing data in a spreadsheet, the application service may select template 801 to prompt an LLM to create a pivot table responsive to the query. If the application service determines that the user's query relates to an existing pivot table, the application service may select template 802 to prompt the LLM to identify one or more modifications to the pivot table in response to the user's query.

In template 801, the application service inserts table metadata, such as row and/or column headers, row and/or column data formats, table headers, filenames, and other information relating to data in a data table. Template 801 also includes examples of output formats for describing a pivot table, such as an Excel pivot table. The output format may be a hierarchical data structure based on a hierarchical data structure of characteristics of a pivot table generally. In some implementations, the output format may include XML or semantic tags for properties or characteristics of the pivot table or key-value pairs for characteristics in a JSON data object. Template 801 provides a range of values available for configuring a pivot table, such as a set of aggregation types available for use in configuring the pivot table. Template 801 also includes rules for how the pivot table is to be configured. For example, the rules may dictate minimum and maximum dimensions of the pivot table in terms of the number of rows and columns. Template 801 also includes the user's natural language input or query.

With a prompt configured according to template 801, the application service submits the prompt to the LLM and receives a pivot table generated according to the prompt.

In template 802, the application service inserts a representation of the pivot table to be modified. In an implementation, the representation is a description of the pivot table in a format in which the LLM is to provide its response (i.e., the modifications). For example, the pivot table description may be a JSON object including the pivot table characteristics and characteristic values. The prompt tasks the LLM with modifying one or more of the characteristics which will modify the pivot table in such a way that the user will be able to determine an answer to his or her query based on the updated configuration of the pivot table.

Figure 9:
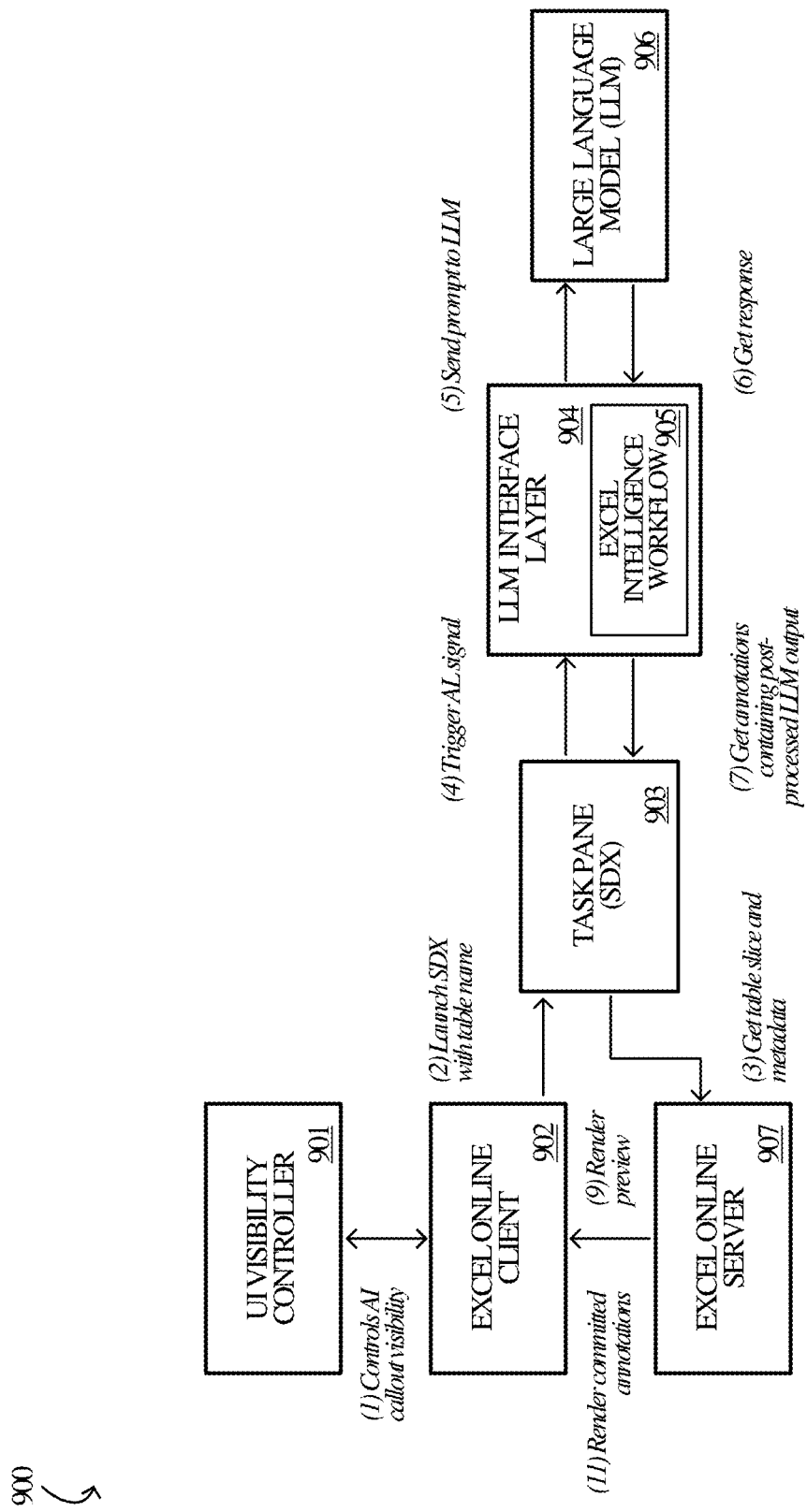
FIG. 9 illustrates an operational architecture for an LLM integration in a spreadsheet environment in an implementation.

Turning now to FIG. 9, FIG. 9 illustrates distributed software architecture 900 showing the components of a Microsoft Excel application including UI visibility controller 901 which controls AI callout visibility, Excel application server 907 and Excel client application 902 in an implementation. Software architecture 900 illustrates a process by which an Excel application responds to a natural language input from a user based on a reply to the input from an LLM.

Excel client application 902 executing on a user computing device in association with Excel application server 907. Excel client application 902 displays a user interface including task pane 903. Task pane engine 903 manages turn-based conversations with LLM 906 about data in a table in the user interface. Task pane engine 903 obtains table slice data (e.g., spreadsheet contextual data and/or portions of the spreadsheet data) and spreadsheet metadata from Excel application server 907.

Excel client application 902 receives natural language input from a user and sends the input to task pane engine 903. Task pane engine 903 receives the natural language input from Excel client application 902 and sends the input to LLM interface layer 904. LLM interface layer 904 operates Excel intelligence workflow 905 and communicates with LLM 905. Excel intelligence workflow 905 of LLM interface layer 904 handles various pre- and post-processing tasks, such as prompt template selection, prompt configuration, data extraction from the reply, and pivot table command generation.

LLM interface layer 904 sends a prompt based on the natural language input to LLM 906. LLM 906 generates a reply to the prompt and transmits the reply to LLM interface layer 904. LLM interface layer 904 generates a response to the input based on the reply received from LLM 906 including post-processed output from LLM 906. LLM interface layer 904 sends the response to task pane engine 903 for configuring a display of the response. Task pane engine 903 writes the configured response to the spreadsheet file and sends the configured response to Excel application server 907 which renders and displays the response and previews in Excel client application 902.

FIG. 10 illustrates computing device 1001 that is representative of any system or collection of systems in which the various processes, programs, services, and scenarios disclosed herein may be implemented. Examples of computing device 1001 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof.

Computing device 1001 may be implemented as a single apparatus, system, or device or may be implemented in a distributed manner as multiple apparatuses, systems, or devices. Computing device 1001 includes, but is not limited to, processing system 1002, storage system 1003, software 1005, communication interface system 1007, and user interface system 1009 (optional). Processing system 1002 is operatively coupled with storage system 1003, communication interface system 1007, and user interface system 1009.

Processing system 1002 loads and executes software 1005 from storage system 1003. Software 1005 includes and implements pivot table process 1006, which is (are) representative of the pivot table processes discussed with respect to the preceding Figures, such as process 200 and workflows 300 and 400. When executed by processing system 1002, software 1005 directs processing system 1002 to operate as described herein for at least the various processes, operational scenarios, and sequences discussed in the foregoing implementations. Computing device 1001 may optionally include additional devices, features, or functionality not discussed for purposes of brevity.

Referring still to FIG. 10, processing system 1002 may comprise a micro-processor and other circuitry that retrieves and executes software 1005 from storage system 1003. Processing system 1002 may be implemented within a single processing device but may also be distributed across multiple processing devices or sub-systems that cooperate in executing program instructions. Examples of processing system 1002 include general purpose central processing units, graphical processing units, application specific processors, and logic devices, as well as any other type of processing device, combinations, or variations thereof.

Storage system 1003 may comprise any computer readable storage media readable by processing system 1002 and capable of storing software 1005. Storage system 1003 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1003 may also include computer readable communication media over which at least some of software 1005 may be communicated internally or externally. Storage system 1003 may be implemented as a single storage device but may also be implemented across multiple storage devices or sub-systems co-located or distributed relative to each other. Storage system 1003 may comprise additional elements, such as a controller, capable of communicating with processing system 1002 or possibly other systems.

Software 1005 (including pivot table process 1006) may be implemented in program instructions and among other functions may, when executed by processing system 1002, direct processing system 1002 to operate as described with respect to the various operational scenarios, sequences, and processes illustrated herein. For example, software 1005 may include program instructions for implementing a pivot table process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1005 may include additional processes, programs, or components, such as operating system software, virtualization software, or other application software. Software 1005 may also comprise firmware or some other form of machine-readable processing instructions executable by processing system 1002.

In general, software 1005 may, when loaded into processing system 1002 and executed, transform a suitable apparatus, system, or device (of which computing device 1001 is representative) overall from a general-purpose computing system into a special-purpose computing system customized to support LLM integrations for pivot tables in an optimized manner. Indeed, encoding software 1005 on storage system 1003 may transform the physical structure of storage system 1003. The specific transformation of the physical structure may depend on various factors in different implementations of this description. Examples of such factors may include, but are not limited to, the technology used to implement the storage media of storage system 1003 and whether the computer-storage media are characterized as primary or secondary storage, as well as other factors.

For example, if the computer readable storage media are implemented as semiconductor-based memory, software 1005 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1007 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 1001 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit." "module" or "system." Furthermore, aspects of the present invention may take the form of a computer program product embodied in one or more computer readable medium(s) having computer readable program code embodied thereon. Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A computing apparatus comprising:
one or more computer-readable storage media;
one or more processors operatively coupled with the one or more computer-readable storage media; and
program instructions stored on the one or more computer-readable storage media that, when executed by the one or more processors, direct the computing apparatus to at least:
receive, in a user interface of an application, a natural language input from a user associated with a spreadsheet hosted by the application;
generate a prompt that includes metadata about the spreadsheet and identifies a required format for descriptions of pivot tables to be elicited from a large language model (LLM) service;
send the prompt to the LLM service to elicit a reply that includes a description of a pivot table having the required format;
receive a reply to prompt from the LLM service that includes the description of the pivot table in the required format; and
generate a pivot table based on the description of the pivot table included in the reply.

2. The computing apparatus of claim 1, wherein the program instructions further direct the computing apparatus to generate a subsequent prompt to modify the pivot table based on subsequent natural language input from the user.

3. The computing apparatus of claim 2, wherein the subsequent prompt identifies the required format.

4. The computing apparatus of claim 3, wherein the program instructions further direct the computing apparatus to parse the description of the pivot table to identify characteristics of the pivot table.

5. The computing apparatus of claim 4, wherein to generate the pivot table according to the reply from the LLM service, the program instructions direct the computing apparatus to identify commands for configuring the pivot table according to the characteristics.

6. The computing apparatus of claim 5, wherein the program instructions further direct the computing apparatus to carry out the commands.

7. The computing apparatus of claim 1, wherein the prompt includes at least a portion of spreadsheet data from the spreadsheet.

8. The computing apparatus of claim 1, wherein the required format comprises a JavaScript Object Notation (JSON) data object.

9. The computing apparatus of claim 1, wherein the user interface comprises a task pane, wherein the task pane is configured to receive user input and to display a response based on the reply from the LLM service.

10. A method of operating an application service, a method comprising:

receiving, in a user interface of an application, a natural language input from a user associated with a spreadsheet hosted by the application;

generating a prompt that includes metadata about the spreadsheet and identifies a required format for descriptions of pivot tables to be elicited from a large language model (LLM) service;

sending the prompt to the LLM service to elicit a reply that includes a description of a pivot table having the required format;

receiving a reply to prompt from the LLM service that includes the description of the pivot table in the required format; and generating a pivot table based on the description of the pivot table included in the reply.

11. The method of claim 10, further comprising generating a subsequent prompt to modify the pivot table based on subsequent natural language input from the user.

12. The method of claim 11, wherein the subsequent prompt identifies the required format.

13. The method of claim 12, further comprising parsing the description of the pivot table to identify characteristics of the pivot table.

14. The method of claim 13, wherein generating the pivot table according to the reply from the LLM service comprises identifying commands for configuring the pivot table according to the characteristics and carrying out the commands.

15. The method of claim 10, wherein the prompt includes at least a portion of spreadsheet data from the spreadsheet.

16. The method of claim 10, wherein the required format comprises a JavaScript Object Notation (JSON) data object.

17. One or more computer-readable storage media having program instructions stored thereon that, when executed by one or more processors operatively coupled with the one or more computer-readable storage media, direct a computing device to:

receive, in a user interface of an application, a natural language input from a user associated with a spreadsheet hosted by the application;

generate a prompt that includes metadata about the spreadsheet and identifies a required format for descriptions of pivot tables to be elicited from a large language model (LLM) service;

send the prompt to the LLM service to elicit a reply that includes a description of a pivot table having the required format;

receive a reply to prompt from the LLM service that includes the description of the pivot table in the required format; and generate a pivot table based on the description of the pivot table included in the reply.

18. The one or more computer readable storage media of claim 17, wherein the program instructions further direct the computing device to generate a subsequent prompt to modify the pivot table based on subsequent natural language input from the user.

19. The one or more computer readable storage media of claim 18, wherein the subsequent prompt identifies the required format.

20. The one or more computer readable storage media of claim 19, wherein the program instructions further direct the computing device to parse the description of the pivot table to identify characteristics of the pivot table.

* * * * *